United States Patent [19]

Largent, Sr.

[11] 4,185,605

[45] Jan. 29, 1980

[54] ENGINE STARTER AND BLOWER INTERLOCK SYSTEM

[76] Inventor: Donald A. Largent, Sr., Rte. 3, Box 412, Escondido, Calif. 92025

[21] Appl. No.: 907,171

[22] Filed: May 18, 1978

[51] Int. Cl.[2] ........................ F02N 17/00; B63J 2/00; B60L 1/00

[52] U.S. Cl. ................................ 123/179 B; 114/211; 307/9; 98/1

[58] Field of Search .................... 123/179 B, 179 BG; 114/211; 307/9, 116; 98/1

[56] References Cited

U.S. PATENT DOCUMENTS

| | | | |
|---|---|---|---|
| 2,569,252 | 9/1951 | Omeron | 123/179 B |
| 3,465,665 | 9/1969 | O'Day et al. | 98/1 |
| 3,599,591 | 8/1971 | Edelson | 114/211 |
| 3,662,727 | 5/1972 | Abplanalp et al. | 123/179 B |
| 3,675,034 | 7/1972 | Abplanalp et al. | 307/9 |
| 3,886,535 | 5/1975 | Cirincione | 307/9 |
| 3,948,202 | 4/1976 | Yoshikawa | 114/211 |
| 3,951,091 | 4/1976 | Doench | 123/179 B |

*Primary Examiner*—Charles J. Myhre
*Assistant Examiner*—M. Moy
*Attorney, Agent, or Firm*—Brown & Martin

[57] ABSTRACT

A combined engine starting and ventilating control system includes a source of electrical power and a circuit interconnecting the source of power to the ventilating blower motor and the starter motor and ignition system with an interlock timing device preventing connection of the power source to the starting motor and ignition system until the ventilating motor has been in operation a predetermined period of time.

7 Claims, 2 Drawing Figures

ENGINE STARTER AND BLOWER INTERLOCK SYSTEM

BACKGROUND OF THE INVENTION

The present invention relates to engine starting control circuits and pertains particularly to a combined starting and ventilating circuit for enclosed gasoline engines.

A number of people are killed or severely injured each year due to explosions or fires resulting from gasoline vapors around enclosed gasoline engines. This is particularly a problem for inboard gasoline-powered marine engines. Such marine engines are typically mounted in an enclosed engine room or compartment wherein gasoline vapors can accumulate if insufficient ventilation is provided.

Most power boats utilizing gasoline engines have a ventilated engine compartment which is positively ventilated when the engine is running. However, most such compartments are not ventilated by a positive ventilation means apart from the engine. Those that do have positive ventilation systems depend on the action of the operator to start the ventilation system and wait an appropriate length of time before starting the engine. This is in order to insure that gasoline fumes accumulated are drawn from the compartment and expelled therefrom to prevent ignition by a spark or the like when the engine is being started.

With such systems, the operator is frequently careless in timing the ventilation cycle and oftentimes forgets the ventilation system entirely. This can result in very hazardous conditions.

It is therefore desirable that some means be available which insures positive ventilation of the engine compartment for gasoline engines prior to the starting thereof.

SUMMARY AND OBJECTS OF THE INVENTION

It is accordingly the primary object of the present invention to overcome the above problems of the prior art.

Another object of the present invention is to provide a positive ventilation system for gasoline engine compartments that automatically insures positive ventilation of the compartment prior to engine starting.

A further object of the present invention is to provide an interlock control system for an engine compartment ventilating system and the engine starting system that prevents starting of the engine until a predetermined period of time has elapsed during operation of the ventilating system.

In accordance with the primary aspect of the present invention, a combined ventilating and starting control system includes a source of power for operating the ventilating blower and the engine starter that is interconnected with timing means for preventing operation of the starter motor and ignition system until a predetermined lapsed time of operation of the blower motor.

BRIEF DESCRIPTION OF THE DRAWINGS

The above and other objects and advantages of the present invention will become apparent from the following description when read in conjunction with the drawings, wherein.

DETAILED DESCRIPTION OF A PREFERRED EMBODIMENT

Figure 1:
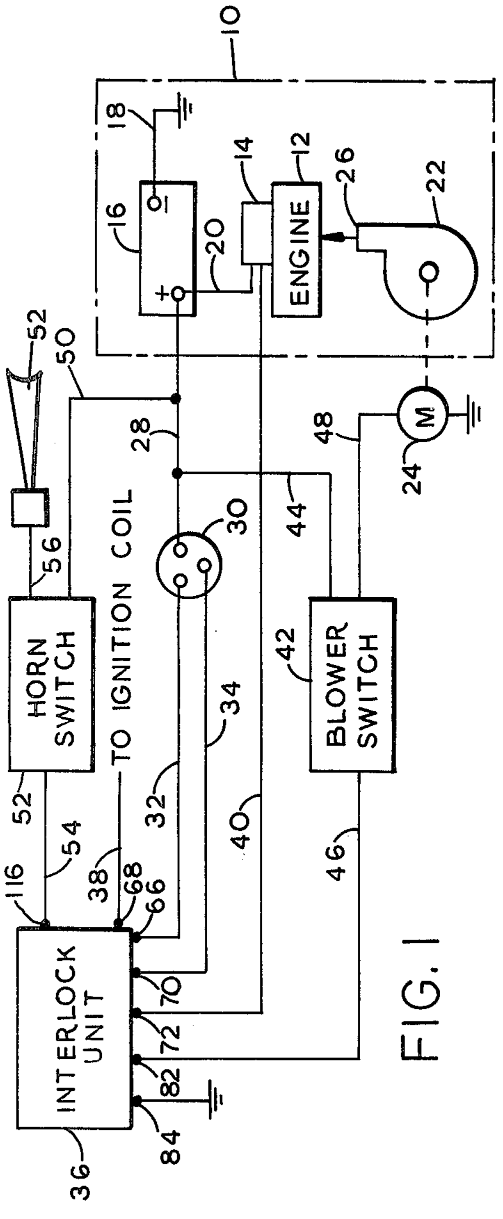
FIG. 1 is a schematic layout of a control system in accordance with the invention.

Turning to the drawings, specifically to FIG. 1, a combined engine starting and engine compartment ventilating control system is schematically illustrated. This system is adapted, for example, for marine vessels powered by gasoline engines. As best seen in FIG. 1, an engine compartment 10 contains a gasoline engine 12 having a starter motor 14 powered by means of a battery 16 of suitable power. The battery is connected by a conductor 18 to ground, and a conductor 20 to the starter motor 14.

A ventilating blower 22 of a suitable type and volume capacity to properly ventilate the engine compartment is driven by a motor 24 for drawing air from the compartment 10 and expelling it into the atmosphere by way of an outlet 26. The motor 24 and the blower 22 may be mounted within the compartment or externally thereof. Power for controlling the ignition and starting of the engine is conducted by way of a conductor 28 to a starting and ignition switch 30. This starter and ignition switch controls the conducting of power by way of conductors 32 for ignition control and 34 for starter switch control by way of an interlock system 36. Power is then conveyed by way of conductors 38 and 40 for the engine ignition coil and starter solenoid control, respectively. The interlock unit 36, to be described later with respect to FIG. 2, includes timing control means for preventing activation of the engine ignition coil or starter solenoid until after the blower motor 24 has been operating for a predetermined period of time. Power for controlling the interlock is supplied thereto by way of the blower switch 42 which is connected to the power source by conductor 44 and thence to the interlock unit by way of conductor 46. A conductor 48 connects the power through the switch 42 to the motor 24.

An alternate source of power for bypassing the main timing control or timing circuit of the interlock unit is connected through the horn circuit and includes a conductor 50 connecting power to a horn switch or button 52 which is then connected by way of conductor 54 to the interlock unit and by way of conductor 56 to a horn 58. As will be explained, this alternate circuit permits over-ride of the basic time control for use in emergency situations for providing for a quicker start-up of the engine than normally possible. Even with this by-pass circuit, however, a minimum predetermined period of time must pass before the power to the engine for starting purposes can be provided.

Figure 2:
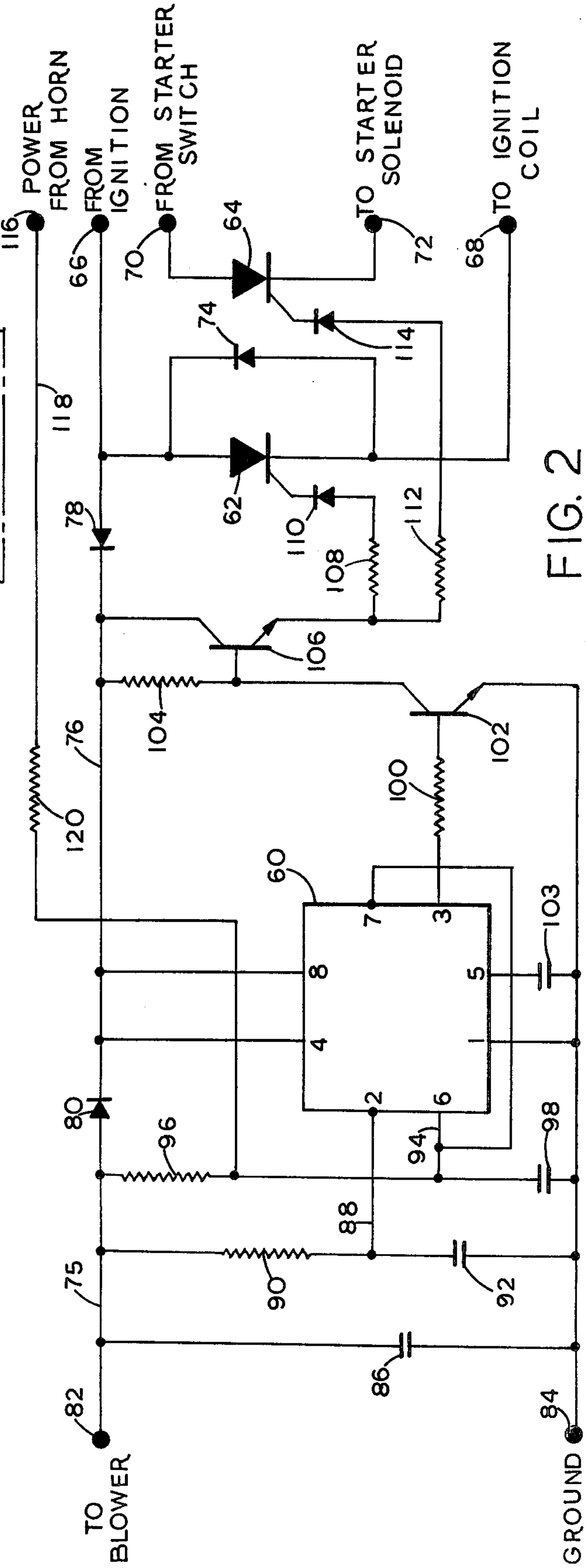
FIG. 2 is a schematic circuit diagram of the interlock unit.

Turning now to FIG. 2 of the drawing, the control circuit of the interlock system or unit 36 is illustrated. The heart of the control system is an integrated circuit device 60 which is designed for generating accurate timing delays or oscillations. This device is available as a model No. LM555 or LM55C timer from National Semiconductor, Inc., or as a model No. NE555V from Signetics Corporation. The device includes eight pins for connecting into various circuits for various modes of operation. These pins, for the sake of convenience, are numbered the same 1–8 as in the device. This timer, as will be explained, functions in conjunction with other circuit elements for controlling a pair of silicon rectifiers 62 and 64 which function to control the conduction of power from the ignition and starter switches to the ignition coil and starter solenoid. Power from the ignition switch is connected into the circuit at terminal 66 and power to the ignition coil at 68. Power into the rectifier 64 is connected at terminal 70 and power out of the rectifier to the starter solenoid is by way of terminal 72. A diode 74 is connected across the terminals of rectifier 62 to keep the voltage across the transistor from going negative for thereby avoiding possible damage to the rectifier 62.

The primary circuit for conducting power to control the timer circuit is from the blower switch through terminal 82 by way of a conductor 46. This conductor connects to a terminal 82 for connecting to the blower for conducting power to the timer when the blower is on. The timer unit is grounded by a ground at 84. A conductor including a capacitor 86 is connected across terminals 82 and 84 for filtering the voltage transients in the system to ground. The trigger circuit for the timer 60 includes a conductor 88 having a resistor 90 connecting the primary power source conductor 75 and a capacitor 92 to ground. Alternate sources of power for rectifiers 62 and 64 are provided through diodes 78 and 80 through conductor 76.

The primary timing network includes a conductor 94 having a resistor 96 connected to the primary power source 75 and a capacitor 98 connected to ground with the conductor 94 connected to the threshold pin 6 of the timing device 60. This threshold pin 6 of the timing device 60 controls the outputs of the remaining pins of the device. When the charge voltage of the capacitor 98 raises to $\frac{2}{3}$ of the applied voltage on or across conductor 75 and ground 84, the voltage output of pin 3 goes to ground or 0 volts. An inverter circuit including resistor 100 connected to transistor 102 and from resistor 104 to primary power source or conductor 76 functions as an inverter changing the output of IC pin 3 to primary power voltage applied to the base of transistor 106. A capacitor 103 is connected between transistor 102 and the control voltage pin 5 of the timer device 60.

The gates of the silicon rectifiers 62 and 64 are then controlled by their respective control circuits including resistor 108 and diode 110 for rectifier 62 and resistor 112 and diode 114 for the silicon controlled rectifier 64.

The above circuit, when powered from the ignition coil or blower switch solely through conductor 75 with resistor 96 and capacitor 98, with these becoming an RC timing network of a predetermined time interval. This prevents operation of either the starter solenoid or ignition coil until the predetermined period of time has lapsed. The time interval is determined by the values of these components and is preferably five (5) minutes. This time interval would be adequate for a reasonable ventilating system and would not be an unreasonable period of time to wait.

The system is provided with means for overriding or altering the time lapse in case of emergency. This system includes connection of the horn circuit as described in FIG. 1 to an input terminal 116 connected by way of a conductor 118 through a resistor 120 to the conductor 94 between the resistor 96 and the threshold terminal 6. This provides a different RC circuit with resistor 120 and capacitor 98 having different values such that the timing network or circuit for threshold pin 6 has a much shorter time delay. Thus, a shorter time elapses before output from the timer device 60 for control of the rectifiers 62 and 64 for operation of the ignition coil and starter solenoid. Thus, should an emergency exist such that it is necessary to start the engine without the customary delay of from 5 to 10 minutes, the operator merely turns on the blower switch and activates the horn switch 52, thus conducting power to the alternate RC timing network to provide an alternate time delay. The advantage of using the horn circuit is that the horn blast will be so unpleasant that this circuit will be used only in an emergency.

Thus, from the above description, it is seen that I have provided a very simple and inexpensive safety control system for enclosed gasoline engines for interconnecting an engine starter circuit and a vent blower circuit for preventing starting of the engine until a predetermined ventilating of the engine compartment has occurred.

While I have illustrated and described my invention by means of specific embodiments, it is to be understood that numerous changes and modifications may be made therein without departing from the spirit and scope of the invention as defined in the appended claims.

Having described by invention, I now claim:

1. An engine ventilating and starting control system, comprising in combination:

- a source of electrical power,
- a starting motor for starting an engine,
- a ventilating blower motor for powering
- circuit means for selectively connecting said source of power to said blower motor and said starter motor, said circuit means including first time delay means preventing connection of said power source to said starting motor until said blower motor has been connected to said source for a first predetermined period of time,
- means for bypassing said first time delay means for establishing a second predetermined period of time shorter than said first predetermined period of time during which connection of said power source to said starting motor is prevented,
- said means for bypassing said first time delay means includes a horn circuit that simultaneously activates an alternate timing circuit upon continuous activation of the horn circuit for said second predetermined period of time.

2. The control system of claim 1, wherein said circuit means includes a rectifier for conducting power for control of the starting motor, and said timing delay means includes an integrated circuit device having threshold and trigger inputs and an output for controlling said rectifier.

3. The control system of claim 1, wherein said circuit means includes:

- an ignition circuit including an ignition switch, an electronic switch, an ignition coil, and conductor means connecting said ignition switch through said electronic switch to said ignition coil, and
- a starter circuit including an starter switch, an electronic switch, a starter solenoid, and conductor means connecting said starter switch through said electronic switch to said starter solenoid.

4. An engine ventilating and starting control system, comprising in combination:

- a source of electrical power,
- a starting motor for starting an engine,
- a ventilating blower motor for powering a ventilation fan,
- circuit means for selectively connecting said source of power to said blower motor and said starter motor, said circuit means including timing delay means preventing connection of said power source to said starting motor until said blower motor has been connected to said source for a predetermined period of time, said circuit means including an ignition circuit including an ignition switch, an electronic switch, an ignition coil, and conductor means connecting said ignition switch through said electronic switch to said ignition coil, and a starter circuit including a starter switch, an electronic switch, a starter solenoid, and conductor means connecting said starter switch through said electronic switch to said starter solenoid, wherein said electronic switches are silican rectifiers, and each rectifier is controlled by the output from an integrated circuit device having a trigger input connected in a first RC circuit, and a threshold input connected in a second RC circuit.

5. The control system of claim 4, wherein said first and said second RC circuits are connected to a conductor supplying power from said source to said blower motor.

6. The control system of claim 5, including a third RC circuit connected to said threshold input.

7. The control system of claim 6 wherein said third RC circuit is connected to a conductor supplying power from said source to a horn.

* * * * *